United States Patent [19]

Arthur

[11] Patent Number: 5,181,695
[45] Date of Patent: Jan. 26, 1993

[54] ANTI-GLARE SHIELD SYSTEM FOR HIGHWAY MEDIAN BARRIERS

[76] Inventor: W. Eugene Arthur, 1930 W. Winton Ave., Bldg. 11, Hayward, Calif. 94545

[21] Appl. No.: 757,829

[22] Filed: Sep. 11, 1991

[51] Int. Cl.$^5$ .............................................. E01F 7/06
[52] U.S. Cl. ................................... 256/13.1; 256/24; 404/9; 403/187
[58] Field of Search ............... 256/13.1, 24, 67, 65, 256/12.5, 1; 404/9, 10, 6; 403/354, 192, 187, 378, 379

[56] References Cited

U.S. PATENT DOCUMENTS

| | | | |
|---|---|---|---|
| 4,338,041 | 7/1982 | Schmanski | 256/13.1 X |
| 4,502,812 | 3/1985 | Zucker | 256/13.1 X |
| 4,522,530 | 6/1985 | Arthur | 404/10 |
| 4,958,954 | 9/1990 | Schmanski et al. | 404/10 |
| 5,022,781 | 6/1991 | Smith | 256/13.1 X |

FOREIGN PATENT DOCUMENTS

| | | | |
|---|---|---|---|
| 134607 | 3/1985 | European Pat. Off. | 404/9 |
| 1941602 | 2/1971 | Fed. Rep. of Germany | 256/13.1 |

Primary Examiner—Randolph A. Reese
Assistant Examiner—Harry C. Kim
Attorney, Agent, or Firm—Jacox & Meckstroth

[57] ABSTRACT

A series of horizontally spaced vertical blades each has a uniform thickness and opposite vertical edge portions projecting in opposite directions, and a lower end portion of each blade is locked within a slot of a corresponding cylindrical base member by a pair of retractable cross pins. The base members are mounted on interlocking joints of a series of base rail sections which precisely space the blades and mount on the top surface of a concrete highway median barrier. Bolts extend downwardly through the base members into anchors expanded within the barriers and secure each base member and the underlying rail sections of the barrier. Each blade and corresponding base member are rotatably positionable on the underlying rail sections which have upward projections for locating the base member and blade at a selected predetermined angle. The upper end portions of the blades may be releasably connected by a horizontal cable for use in high wind areas.

9 Claims, 1 Drawing Sheet

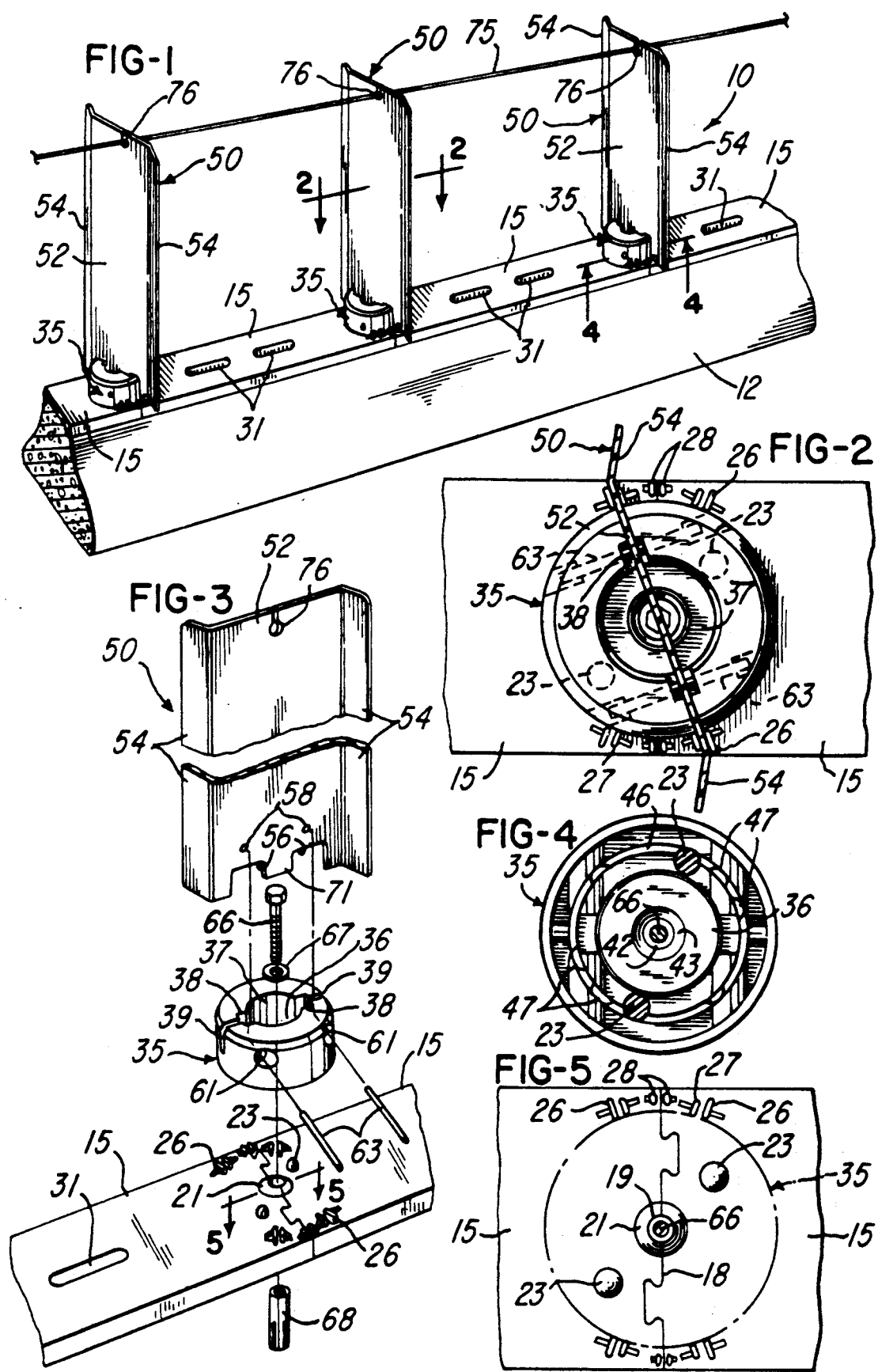

ANTI-GLARE SHIELD SYSTEM FOR HIGHWAY MEDIAN BARRIERS

BACKGROUND OF THE INVENTION

The present invention relates to an anti-glare and anti-gawk shield system of the general type disclosed in U.S. Pat. No. 4,338,041, and which is commonly used on precast concrete median barriers for dividing opposing traffic lanes of a highway. In such a shield system, it is desirable for the vertical blades to be capable of receiving multiple lateral impacts from motor vehicles and then return to vertical upright positions. It is also desirable for the blades to be quickly replaceable in order to minimize the time required by a highway service person for replacing a damaged blade. In addition, it is desirable for the shield system to be easily and quickly installed on the top surface of a continuous series of concrete barrier sections and for each vertical blade to be able to withstand substantial wind forces and to be angularly positionable depending on the location of the shield system and the spacing between the opposing highway lanes. It is further desirable for the shield system to be capable of being placed in compact containers both for shipping to a site and for storage after removal of the system from temporary highway barriers.

SUMMARY OF THE INVENTION

The present invention is directed to an improved anti-glare shield system which provides all of the desirable features mentioned above and which also can be economically produced. In general, the features and advantages of an anti-glare shield system constructed in accordance with the present invention are provided by a series of vertical blades each formed of a semi-rigid plastics material, preferably having a uniform thickness. Each blade has opposite vertical edge portions each projecting at an acute angle from a substantially flat center portion to provide the blade with a Z-shape cross-sectional configuration and vertical rigidity and stability.

The lower end portion of each vertical blade is received within a slot formed in the center of a corresponding cylindrical base member also molded of a semi-rigid plastics material which absorbs vibrations. Each base member is mounted on an interlocking joint of a pair base rail sections also molded of a rigid plastics material, and the base rail sections mount on the top surface of the highway median barrier. A bolt extends downwardly through each base member and the corresponding interlocking joint of the rail sections into an anchor expanded within the concrete barrier. A pair of cross pins project laterally through each base member and the lower end portion of the corresponding blade for locking the blade to the base member and are quickly retractable for removing or replacing the blade. Each base member is rotatably positionable on the axis of its locking bolt, and the rail members have upwardly projecting protrusions which locate the base member and the corresponding blade at a selected predetermined angle with respect to the rail sections. The upper end portions of the blades may be interconnected by horizontal cable which snap fits into a slot within each blade.

Other features and advantages of the invention will be apparent from the following description, the accompanying drawing and the appended claims.

BRIEF DESCRIPTION OF THE DRAWING

FIG. 1 is a fragmentary perspective view showing an anti-glare shield system constructed in accordance with the invention and mounted on the top surface of a highway median barrier;

FIG. 2 is a fragmentary section of the shield system and taken generally on the line 2—2 of FIG. 1;

FIG. 3 is an exploded view of a portion of the shield system shown in FIG. 1;

FIG. 4 is a bottom view of a typical base member, taken generally on the line 4—4 of FIG. 1; and FIG. 5 is a fragmentary plan view of an interlocking joint for a pair rail sections, taken generally on the line 5—5 of FIG. 3.

DESCRIPTION OF THE PREFERRED EMBODIMENT

Referring to FIG. 1, an anti-glare shield system 10 is adapted to be mounted on the top surface of a continuous concrete highway median barrier 12 and includes a series of longitudinally extending and interconnected base rail members or sections 15 each having a preferred length of 24 inches. Each rail section 15 is preferably molded of a rigid plastics material, and the bottom surface of each section has cavities for maintaining a general uniform wall thickness of approximately 0.25". As shown in FIG. 5, the opposing end portions of the rail sections 15 have an interlocking dovetail joint 18 which is interrupted by a center hole 19 surrounded by a slight dome-shaped load bearing surface 21. The end portion of each rail section 15 also includes a projection 23 having a part-spherical upper surface and two sets of upwardly projecting tabs 26, 27 and 28. A pair of longitudinally slots 31 are formed within the center portion of each rail section 15 and are adapted to receive hold-down bolts, if desired.

A cylindrical hollow base member 35 overlies the end portions and interlocking joint 18 for each pair of base sections 15 and is preferably molded of a rigid plastics material. Each of the base members 35 includes a cup-shaped center portion 36 which defines a cylindrical bore 37 interrupted by diametrically opposed wide slots 38 and narrow slots 39. The bottom wall of the cup-shaped portion 36 has a center hole 42 surrounded by a part-spherical recess 43 which mates with the surface 21 on the opposing end portions of the underlying rail sections 15. As also shown in FIG. 4, the hollow base member 35 includes an annular wall 46 which has a series of diametrically opposite pairs of recesses 47 for selectively receiving the projections 23 on the rail sections 15.

Each of the base members 35 supports a semi-rigid vertical shield member or blade 50 which is formed of a semi-rigid recyclable plastics material such as reclaimed polypropylene. Each blade 50 preferably has a width of about 9 inches and a vertical height, between 24 inches and 30 inches, and includes a substantially flat center portion 52 integrally connecting opposite vertical edge portions 54 which project from the center portion 52 in opposite directions, preferably by an angle of approximately 35°. Each blade 50 may be a die-cut section of an extrusion having a Z-shaped cross-section, or the edge portions 54 may be heat-formed from an extruded flat sheet or strip of plastics material.

Preferably, each blade 50 is green or gray in color preferably with a gloss surface, and a recess 56 is formed within the bottom end surface of each blade 50 for receiving the lower portion of the supporting base member 35 and to permit the outer portions of the blade to seat on the underlying rail sections 15. A pair of holes 58 are formed within the lower end portion of each blade 50 and aligned with corresponding horizontal or cross holes 61 molded within the base member 35. After a blade 50 is inserted by friction fit into the slots 39 within its supporting base member 35, a pair of drift or roll pins 63 are pressed into the aligned holes 58 and 61 for positively retaining or locking the blade within the slots 39.

The assembly of each base member 35 and the underlying rail sections 15 is positively secured to the concrete barrier 12 by a bolt 66 which receives a washer 67 and extends downwardly through the holes 42 within the base member 35 and the vertically aligned hole 19 within the connected base sections 15. The bolt 66 is threaded into a tubular anchor 68 having a slotted lower end portion which is expanded by a tool (not shown) into a hole formed within the top surface of the concrete barrier 12. Preferably, each anchor 68 is of the type sold under the trademark HILTI and is installed within a hole drilled in the concrete with the aid of a setting tool (not shown) which expands the lower slotted portion of the anchor into positive engagement with the concrete. Preferably, a drilling fixture (not shown) is used for drilling longitudinally spaced holes within the top surface of the concrete barrier 12, and the fixture locates on each hole for drilling the next successive hole. Preferably, the holes receiving the anchors 68 are longitudinally spaced at intervals of 24 inches, corresponding to the length of each rail section 15. The cylindrical bore 37 and opposing slots 38 within each base member 35 also permit the base member to be used for receiving and supporting the lower end portion of a self-erecting cylindrical roadway marking post of the type disclosed in FIG. 6 and 7 of U.S. Pat. No. 4,522,530. The opposite end portions of a cross pin within the lower end portion of the marking post are received within the slots 38 within the base member 35, and the cross pins 63 retain the outwardly projecting end portions of the cross pin within the marking post, as shown in U.S. Pat. No. 4,522,530.

After each bolt 66 is tightened into an anchor 68 for securing a corresponding base member 35 and underlying end portions of the base sections 15 to the concrete barrier 12, a blade 50 is inserted or pressed into the opposing slots 39, and the cross pins 63 are pressed or driven inwardly through the holes 58 for securing or locking the blade 50 to the base member 35. As shown in FIG. 3, an integral tab 71 projects downwardly from the center portion 52 of each blade 50 and contacts the head of the corresponding bolt 66 after the blade 50 is locked to the base member 35 to prevent the bolt 66 from vibrating loose and unthreading from the locking anchor 68. The holes 19 within the rail sections 15 and the holes 42 within the base members 35 are sufficiently large to receive the anchors 68. Thus after the longitudinally spaced holes are drilled within the top surface of the concrete median barrier 12 and the rail sections and base members 35 are seated on the top surface, the anchors 68 may be inserted into the holes within the concrete through the holes 42 and 19. Each anchor 68 is expanded with a setting tool inserted downwardly through the holes 42 and 19 into the anchor 68. In some installations where the blades 50 are exposed to high winds, a flexible stainless steel guide cable 75 is pressed into inverted keyhole-shaped slots 76 within the upper end portions of the blades 50 for connecting the blades to avoid vibration due to wind.

From the drawing of the above description, it is apparent that an anti-glare shield system constructed and installed in accordance with the present invention, provides desirable features and advantages. As one important feature, each of the blades 50 may be easily and quickly installed and/or replaced simply by driving the friction held retaining pins 63 laterally out of engagement with the holes 58. In addition, the horizontal cross-sectional configuration of each blade 50 provides the blade with substantial stability for withstanding high winds and also cause each blade to return to an upright vertical position in the event the blade is accidentally impacted by an obstacle projecting laterally from a motor vehicle. Also, the use of a single bolt 66 for securing each base member 35 and the underlying end portions of the rail sections 15 to the concrete barrier 12, simplifies the installation of the shield system and permits the system to be efficiently installed within a relatively short period of time.

The base sections 15 also serve as a template or longitudinal spacer for locating each base member 35 and corresponding blade 50 and cooperate to provide for rapid installation of the shield system. As also shown in FIG. 2, the projections 23 and 26–28 on the opposite end portions of each rail section 15 and the nesting of the projections 23 into the recesses 47, provide for conveniently selectively orientating or positioning the base members and blades 50 at different predetermined angles, according to the desired angular position for the blade 50. That is, each blade 50 may be positioned with the center portion 52 located at a right angle with respect to the rail sections 15 or at an acute angle of about 23° with respect to the right angle or perpendicular position. In each of the selectable positions for the base members 35, the projections 23 on the opposing end portions of the rail sections 15 project upwardly into a corresponding pair of cavities 47 for precisely positioning the base members 35 and blades 50. Also, the engagement of each blade 50 with the rail sections 15 outboard of each supporting base member 35, provides the blade with stability for preventing vibration of the blade and movement of the blade from its normal vertical position.

It is also apparent that after the blades 50 and bolts 66 are removed, the interlocking joints 18 of the base sections 15 permit the base sections to be disconnected and stored in a container only slightly longer than the base sections 15 for receiving the base sections, blades 50 and base members 35. Such compact storage is desirable after the shield system is used on a temporary barrier 12 installed during highway repair. It is also apparent that the base members 35 and blades 50 may be used without the rail sections 15 wherein the base members 35 are attached directly to a concrete barrier or directly to a road surface by means of releasable or removable adhesive pads located between the base members 35 and the supporting surface.

While the form of shield system herein described constitutes a preferred embodiment of the invention, it is to be understood that the invention is not limited to this precise form, and that changes may be made therein without departing from the scope and spirit of the invention as defined in the appended claims.

The invention having thus been described, the following is claimed:

1. An anti-glare shield system adapted for use on a highway median barrier having a top surface, comprising a series of horizontally spaced and substantially vertical blades of semi-rigid material, each of said blades having a height substantially greater than its width and including an upper end portion and a lower end portion, a corresponding base member for each of said blades and having means defining a slot for receiving said lower end portion of said blade, means for releasably securing each of said blades to the corresponding said base member, a series of elongated base rail sections adapted to seat on the top surface of the barrier, said base rail sections each having a length corresponding to the horizontal spacing between said blades and having opposing end portions forming longitudinally spaced joints for said base rail sections along the top surface, said base members being mounted on said base rail sections overlying said joints, and a series of threaded bolts extending downwardly through said base members for quickly and positively securing said base members and the underlying said end portions of said base rail sections to the top surface of the barrier.

2. A shield system as defined in claim 1 wherein each of said blades comprises a body of semi-rigid plastics material with a generally uniform thickness, and each said blade has a vertically extending and laterally deformed portion to provide said blade with vertical stiffness.

3. A shield system as defined in claim 2 wherein said securing means for each said blade comprises a pair of cross pins extending horizontally through corresponding sets of said aligned openings in friction engagement with the corresponding said base member.

4. A shield as system as defined in claim 1 wherein the adjacent said end portions of said base rail sections are connected by an interlocking said joint.

5. A shield system as defined in claim 1 wherein each of said blades includes a portion projecting downwardly within the corresponding said base member and adjacent the corresponding said bolt for blocking said bolt and preventing unthreading of said bolt.

6. A shield system as defined in claim 1 and including a horizontally extending elongated flexible element connecting said upper end portions of said blades.

7. An anti-glare shield system adapted for use on a highway median barrier having a top surface, comprising a series of horizontally spaced and substantially vertical blades of semi-rigid material, each of said blades having a height substantially greater than its width and including an upper end portion and a lower end portion, a corresponding base member for each of said blades and having means defining a slot for receiving said lower end portion of said blade, means for releasably securing each of said blades to the corresponding said base member, a series of elongated base rail sections adapted to seat on the top surface of the barrier, said base rail sections each having a length corresponding to the horizontal spacing between said blades and having opposing end portions forming longitudinally spaced joints for said base rail sections along the top surface, said base members being mounted on said base rail sections overlying said joints, a series of threaded bolts extending downwardly through said base members for quickly and positively securing said base members and the underlying said end portions of said base rail sections to the top surface of the barrier, each of said blades having a generally uniform thickness with vertical opposite edge portions integrally connected by a generally flat center portion defining a plane, and said edge portions project at an acute angle from said plane and in opposite directions to provide said blade with rigidity for withstanding wind pressure and to provide for self-erecting of said blade after receiving an impact.

8. A shield system as defined in claim 7 wherein said base rail sections include means for selectively positioning each of said base members and the corresponding said blade at different angular positions relative to said base rail sections.

9. An anti-glare shield system adapted for use on a highway median barrier having a top surface, comprising a series of horizontally spaced and substantially vertical blades of semi-rigid material, each of said blades having a height substantially greater than its width and including an upper end portion and a lower end portion, a corresponding base member for each of said blades and having means defining a slot for receiving said lower end portion of said blade, means for releasably securing each of said blades to the corresponding said base member, a series of elongated base rail sections adapted to seat on the top surface of the barrier, said base rail sections each having a length corresponding to the horizontal spacing between said blades and having opposing end portions forming longitudinally spaced joints for said base rail sections along the top surface, said base members being mounted on said base rail sections overlying said joints, a series of threaded bolts extending downwardly through said base members for quickly and positively securing said base members and the underlying said end portions of said base rail sections to the top surface of the barrier, each of said base members and the corresponding said blade being rotatable on the corresponding said bolt and relative to the adjacent said end portions of said rail sections, and said end portions of said base rail sections have means for selectively positioning each of said base members and the corresponding said blade at different angular positions relative to said base rail sections.

* * * * *